United States Patent [19]
Kaunitz

[11] 3,849,871
[45] Nov. 26, 1974

[54] METHOD FOR WELDING PIPES

[75] Inventor: Clyde F. Kaunitz, Chicago, Ill.

[73] Assignee: Herbert B. Neander, Oak Lawn, Ill.; a part interest

[22] Filed: Aug. 6, 1973

[21] Appl. No.: 386,173

[52] U.S. Cl.................. 29/483, 29/486, 29/497, 219/137, 285/286
[51] Int. Cl.................. B23k 1/20, B23k 31/02
[58] Field of Search............ 29/483, 487, 494, 497, 29/482, 486; 219/137; 285/286

[56] References Cited
UNITED STATES PATENTS

| | | | |
|---|---|---|---|
| 2,288,433 | 6/1942 | Boetcher et al. | 29/483 X |
| 2,819,517 | 1/1958 | Pursell | 29/483 |
| 2,835,965 | 5/1958 | Armacost | 285/286 X |
| 3,002,191 | 9/1961 | Thielsch | 29/483 |
| 3,406,444 | 10/1968 | Parker et al. | 29/486 X |

Primary Examiner—C. W. Lanham
Assistant Examiner—Victor A. DiPalma
Attorney, Agent, or Firm—Stone, Wagner & Aubel

[57] ABSTRACT

A method for welding large tubular members such as pipe in end-to-end relationship by first machining the ends of the members to form a radially thin, axially extending flange on each end adjacent the interior surface of the member; co-axially aligning the members so that the flanges formed on the ends to be joined are aligned in closely spaced relationship; heating the ends to be joined and particularly, the flanges formed on each end while, at the same time, purging the free oxygen from the space surrounding the adjoining ends of the members by means of inert gas; forcing the heated ends together with sufficient force to upset the radially thin, axially extending flanges and fuse the metal of each flange together to form a root joint which securely joins the two members; smoothing the surface of the root joint about the periphery of the joined members; and, filling the groove formed by the facing ends of the members and the root joint with welding metal to complete and form a perfectly sealed fluid tight joint between the members.

13 Claims, 5 Drawing Figures

METHOD FOR WELDING PIPES

BACKGROUND OF THE INVENTION

This invention relates to methods of welding in general, and, in particular, to a method of welding large tubular members such as pipe together in end-to-end relationship.

There are many known methods of welding tubular members in end-to-end relationship to form fluid conduits. Many of these present methods, however, have limitations which restrict their use to shop work or to small diameter pipes and which are, therefore, not suitable to form perfectly sealed joints between pipes of the wall thickness and diameter necessary for use in gas and oil transportation lines which might be subjected to great external pressures and temperature variations by reason of their location underwater or in Arctic regions. The necessity for having a method of producing a welded joint which cannot only withstand severe environmental conditions, but which also can be accomplished in the field in a minimum time, is critical, particularly in view of the growing demand for oil and gas and the increased environmental concern over possible failures or ruptures in such conduit lines.

Typical pipe sections used in gas or oil transportation conduits range in diameter from 6 to 60 inches, in wall thickness from ⅝ inch to 1½ inches, and in length to approximately 40 feet. The problem with joining pipe sections of such sizes is that the very thick walls required for strength cannot be satisfactorily joined together by welding in a single pass operation. Heat applied to the pipe joint to achieve welding will not sufficiently and uniformly penetrate the metal to allow complete fusion of the material in the two sections across the entire end wall. Thus, the joint is weak, imperfectly sealed and subject to failure. One common method of welding pipe to overcome this problem initially requires that the facing ends of pipes to be joined be either flame cut or machined on an inward taper from the outside diameter to a point near the inside with a reverse taper from that point to the inside diameter. After this cutting is performed, a first weld pass is made from the inside of the pipe, which is commonly referred to as a seal pass or root pass. Successive fill passes are made to fill and complete the joint from the root pass outward. Obviously, the flame cutting of the pipe ends on two opposite tapers to form a "v" takes time. The forming of the root pass from the inside of the pipe is also difficult.

Thielsch (U.S. Pat. No. 3,002,191) teaches a refinement of this fusion welding process by machining the pipe ends to be joined to remove material from each end and form a substantial groove between the pipes having its bottom defined by the abutment together of two lips or roots. The ends of the pipes are placed in spaced relationship and a welding ring inserted between them so that when the temperature of the ends and the ring is raised, the metal of the ring will act to fuse the lips together and form the root pass. Parker et al. (U.S. Pat. No. 3,406,444) also teaches the machining of such lips or lands on the end of each pipe, each having an upwardly extending flange portion to provide extra metal for fusion. The pipe ends are then brought adjacent one another and heated by a heliarc process to form the root weld.

Still another version of the above processes requires extremely accurate machining of the pipe ends to form axially projecting lands on each end. The lands are then carefully spaced a distance of approximately 0.04 inches apart and then sawed to a spacing of 0.062 inches. Following the sawing, a hot wire 0.040 inches in diameter is run between the lands to form a root pass. Successive fill passes are then made until the joint is filled and completed. The extreme accuracy required in this operation is obviously difficult to maintain and is time consuming and expensive to perform in the field.

Another method of welding, called butt welding, has been used to join pipe of small diameters and wall thicknesses. The *American Welding Society Welding Handbook*, Fifth Edition, teaches the butt welding of steel pipe in the field where the pipe has ¼ inch wall. The pipe end must be belled by machining, heat applied and then hydraulic pressure exerted axially in the order of approximately 10,000 lbs./sq. inch of area to be welded to join the pipe ends together. Butt welding is severely limited by the developed pressure of the hydraulic press mechanism. For example, the pipes must be clamped either on the exterior or interior with both radial and axial forces exerted. In a typical 36 inch diameter pipe with a ¾ inch wall, each pipe clamp must exert an axial force of approximately 1,050,000 pounds and a radial force of approximately 700,000 pounds to make the butt weld according to the above method. However, application of such forces would stress the steel at about 21,000 pounds per square inch, whereas the allowable maximum generally in this type of pipe is only 9,000 pounds per square inch. This would break or rupture the tubing. Tubing sufficient to withstand such stresses would be difficult to design and prohibitive in cost and manufacture. For this reason, butt welding has not been used to weld pipe of the sizes necessary for oil and gas transportation lines.

All of the above methods have serious disadvantages, the primary ones being the time and skill required to satisfactorily weld large diameter pipes in the field, the necessity of using extra materials such as welding rings, and, most importantly, the high probability of imperfections existing in the weld, particularly in the root weld. Due to the great expense of repairing pipe and the fluid losses and environmental damage caused by failure of such pipes, each weld must be perfectly formed in an operation which is as automatic and requires as little skill as possible.

SUMMARY OF THE INVENTION

The present invention involves a simple, easily performed method for welding tubular members, such as pipe, in end-to-end relationship by forming a perfectly sealed, extremely strong joint.

The method of this invention overcomes the problems inherent in the prior art methods by uniquely combining butt welding and fusion welding steps to form a perfect joint. The opposite, facing ends of the pipes to be joined are first machined so that a radially thin, axially extending projection or land is formed about the end of each pipe adjacent the interior surface of the pipe. The two pipes are then aligned co-axially with their lands or projections maintained in close, spaced relationship. The adjacent lands and the facing ends of the pipe form a welding groove which extends about the perimeter of the joint of the two pipes. This joint, including the lands, is then heated completely and uniformly while the space around the joint is purged with an inert gas to prevent oxidation. When the joint, including the two thin lip or land areas, has been heated to a predetermined temperature, the pipes are forcibly moved together on their concentric axes with a force sufficient to upset the lands and completely and uniformly weld them together across their entire surface in a root joint. This upset force is obtained from internal alignment clamping means which exert a radial force against the inside surface of the pipe to afford friction to prevent slippage and also exert the axial force to produce the upset. In general, the radial force exerted by the clamping means should be of the order of 1½ times the axial force.

The completely fused and perfect root joint securely and fluid-tightly joins the pipes to one another. If necessary, the inside surface of the welding groove, especially the surface of the root portion may then be machined by means such as a rotary routing tool to remove rough metal from the throat of the joint. This will not be needed because of the manner in which the root weld is made. Finally, successive fill passes are made with suitable welding material until the welding groove is filled and the entire joint is completed.

The above method is extremely fast and, since the heating, butt welding and routing, if needed, could all be done in one station while the fusion welding is done on a previously butt welded joint at a separate station, this method makes it possible to form perfect joints quickly in the field without requiring expertly skilled tradesmen or meeting exacting tolerances. Pipes of practically any desired diameter and thickness can be welded by this method since the narrow root portion or land which is butt welded greatly reduces the weld area and, therefore, the axial and radial clamping forces needed to weld these lands together. By way of example only, the forces necessary to weld the 36 inch diameter pipe above are reduced to a radial force of 300,000 pounds and an axial force of 200,000 pounds on each pipe. The stress is thus reduced to approximately 6,000 pounds per square inch, well within the capability of the pipe. The reduction of the weld area to the root portion allows use of the easier concepts of butt welding, yet permits taking advantage of the heavy wall of the pipe to clamp against. The radial thinness of the lip portion permits uniform induction heating, whereas the normal wall thickness of large pipes does not.

Accordingly, it is an object of the present invention to provide a method for joining tubular members together in end-to-end relationship quickly and efficiently, yet with great reliability.

It is also an object of the present invention to provide a method for joining tubular members in end-to-end relationship by producing a welded joint which securely and perfectly seals these members to one another.

It is a further object of the present invention to provide a method of joining tubular members in end-to-end relationship which involves a unique combination of butt welding and fusion welding procedures to form a perfectly sealed and secure joint between these members.

It is one more object of the present invention to provide a method for welding tubular members in end-to-end relationship in which preparation of the ends of the tubular members may be performed in the shop or field and the weld may be made in the field quickly by semi-skilled personnel with the assurance that each weld will be sound and perfect.

It is still another object of the present invention to provide a method of welding tubular members in end-to-end relationship which does not require machining of such members to exacting tolerances or the use of backing plates to complete the weld.

These and other important objects of the present invention will become apparent from the following description taken in conjunction with the drawings illustrating a preferred application of the method wherein:

FIGS. 1–5 are cross sectional, cut away views of tubular members placed in end-to-end relationship showing schematically the steps of the present invention which produce a perfectly sealed welded joint and wherein:

FIG. 1 shows the machined ends of the tubular members in spaced, end-to-end, aligned relationship;

FIG. 2 shows the heating and gas purging of the members shown in FIG. 1;

FIG. 3 shows the tubular members being forced axially together to upset the root portions on each and weld them together to form a root joint;

FIG. 4 shows rough metal being machined from the surfaces of the root joint; and, FIG. 5 shows the fusion welding of the remainder of the joint between the ends of the tubular members by applying successive layers of weld material.

DESCRIPTION OF THE INVENTION

Figure 1:
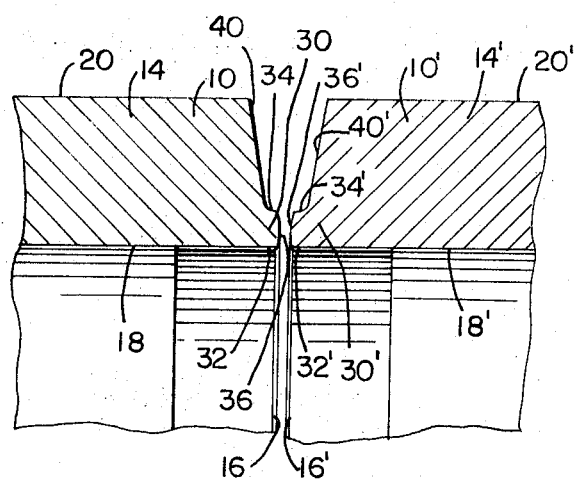

Referring now to the drawings, and, in particular, to FIG. 1, two similar tubular members 10 and 10' are shown in position for joining according to the method of this invention. These tubular members are conventional pipe sections manufactured from a metal chosen according to the particular purpose for which the pipe is designed to serve. These pipe sections may often be 40 feet or more in length, having diameters which vary from 6 inches to 60 inches or more. The thickness of the walls 14 and 14' of each pipe will, again, be dependent upon the conditions of use of the pipe and also the length and diameter of the pipe. This wall thickness may vary from ⅛ inch to as much as 1½ inches.

Pipes 10 and 10' shown in FIG. 1 are placed in end-to-end relationship, that is, so that their ends 16 and 16' face one another. When the pipes are joined, their inside surfaces 18 and 18' should present as smooth a path of travel as possible for the fluid which will flow through them.

The initial step in the method of this invention has been shown in completed form in FIG. 1. This step consists of machining the ends 16 and 16', which are normally parallel to one another when the pipes are placed in end-to-end relationship, into the configuration shown. This is essentially done by removing material from the ends of each pipe, more material being removed near the outside surfaces 20 or 20' of each pipe, than near the inside surfaces 18 or 18'. The material is removed until root portions or lands 30 and 30' are formed on the ends of each pipe, preferably adjacent the interior surfaces 18 and 18', respectively. Each land, such as 30, has generally parallel upper and lower surfaces 32 and 34 joined by a facing surface 36 so that it projects parallel to the central axes of pipes 10 and 10' toward the opposite land. The portion of the end of each pipe 10 and 10' above the upper surface 34 and 34' of each root portion or land 30 and 30' is tapered inwardly at an angle of approximately 9° or 10°. These inwardly tapered end portions 40 and 40', together with their respective root portions 30 and 30' define, when the pipes are co-axially aligned and moved into abutting relationship, a welding groove 50, as will be explained in further detail below.

The height or thickness of each root portion 30 or 30', that is, the distance between lower surface 32 and the upper surface 34 is significantly less than the normal pipe wall thickness and is preferably approximately 0.200 inches but may be as large as 0.25 or 0.30 inches. The projection or extension of the root portion from the foot of the tapered portion 40 of the end wall of each pipe is normally of the order of one-eighth of an inch. It should be understood that these dimensions are intended to be merely illustrative and may vary according to the size, type and use of the pipe being welded without departing from the teachings of this invention.

Once the machining of the ends 16 and 16' of each section of pipe 10 and 10' has been carried out, the pipes are co-axially aligned, as shown in FIG. 1, and clamped in such alignment by suitable clamping and force means 42 and 42', as will be explained in detail below. Co-axial alignment of pipes 10 and 10' will assume sufficient alignment of root portions 30 and 30' to satisfactorily carry out the remaining steps of this invention. When alignment has been achieved, an induction heater 52 is placed about the exterior surface 20 of the pipes over the joint or area to be welded between each pipe. This induction heater 52 is of conventional design and normally includes coils 54 and an insulating cover 56. A conventional gas purging means (not shown) is also activated to supply inert gas to the interior and exterior surfaces of the pipe surrounding the joint and thereby force excess air and oxygen out of the area of the joint. The gas filled areas 58 inside the cover 56 of the heater 52 within the interior of the pipes are filled with inert gas while the coils 54 of the induction heater 52 are energized. Thus, the joint area is simultaneously heated and oxygen is eliminated to reduce the possibility of oxidation and microcracking.

Figure 2:
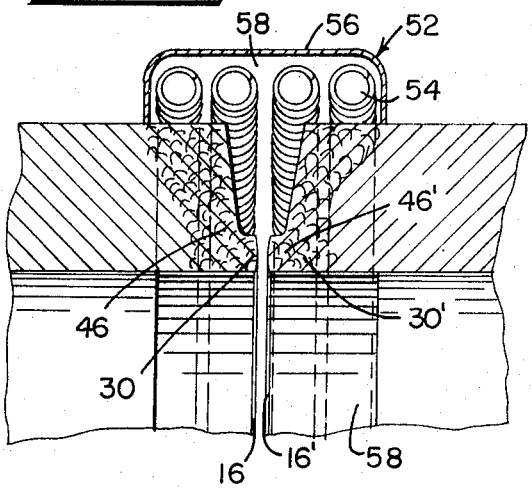

The two radially thin, axially extending root portions or lands 30 and 30' are then heated to a predetermined temperature. The transfer of thermal energy through the metal at the ends of each pipe is shown by the shaded areas 46 and 46' in FIG. 2. This shading shows that the induction heated zone at the ends of both pipes is not only approximately the same, but that heating is uniform and complete, particularly through the radial thickness of the root portions 30 and 30', which is critical in obtaining a perfectly sealed butt weld. It is clear that the heating of the area to be welded is much more quickly, easily and completely accomplished in a pipe machined in the fashion of the present invention than in a section which encompasses the entire wall thickness of the pipe as in previous methods. Moreover, if the entire wall thickness of a large oil or gas pipe were attempted to be heated, it is likely that the portions adjacent the interior surface of the pipe would not be uniformly or sufficiently heated, so that any butt weld attempted across such large weld areas would be incomplete or insecure.

During the heating and alignment step of the present method, the spacing between the facing edges 36 and 36' of the root portions 30 and 30' may be of the order of seven-sixteenths inch. The degree of spacing can be varied from the seven-sixteenths inch given as an example to any suitable spacing for making a good root joint.

The pipe ends are heated by the induction heater 52 to a temperature which is sufficient to assure that the root portions 30 and 30' will fuse when they are forced or butted together. This temperature, of course, will vary with the thickness of the root portions and the material from which the pipe is constructed, but may readily be ascertained by either simple experimentation or use of any one of a number of standard metallurgical texts or pipe manufacturers references.

Figure 3:
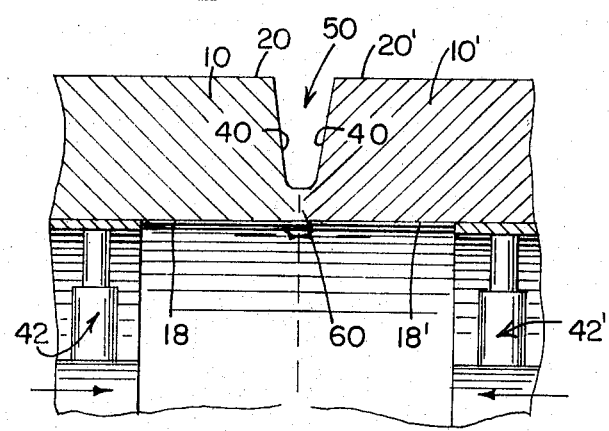
Figure 4:
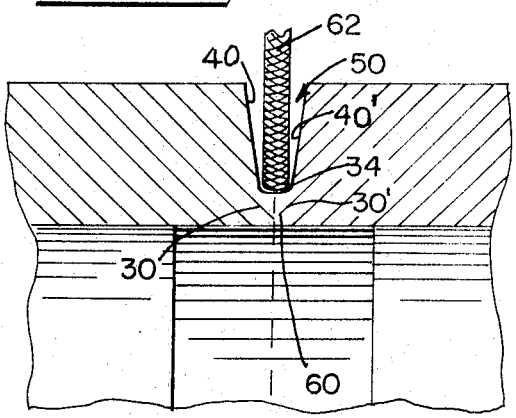

When the metal of the pipe ends is heated to the predetermined temperature, a butt weld is made by moving the pipe sections 10 and 10' axially toward one another into intimate fusing contact, as shown in FIG. 3, with a sufficient force to upset root portions 30 and 30' and form a mechanically solid root weld which has a relatively smooth finish around the inner wall of the pipes at the joint. This axial upset force is obtained through internal alignment clamping and force means 42 and 42' which also exert a radial force on the walls of each pipe. This radial force should be approximately 1½ times the axial upset force and is necessary to supply a sufficient force of friction to prevent slippage of the pipes relative to the clamping means during upset, which would mar their interior surfaces.

By way of example only, to upset the root portions in a 36 inch diameter pipe having a ¾ inch wall, the internal clamping and force means must exert a radial force of 300,000 pounds on each pipe to provide enough friction to prevent slippage and withstand the 200,000 pound axial force also exerted to achieve the 10,000 pounds of force per square inch of weld area needed to upset the root portions.

Thus, root portions 30 and 30' are welded together as shown in FIG. 3, to form the seal or root joint 60. This root joint 60 completely welds the pipes 10 and 10' together. Since the root portions have been uniformly heated and have been forced together with a force known to be sufficient to cause upset and to join them completely across their entire surfaces, the root joint is a complete and fluid-tight joint. Since the pipes are axially aligned and spaced at a constant distance about their circumference, the joint 60 is uniform and perfect about the entire circumference of the pipes and only needs filling in the outer groove 50 to achieve the desired mechanical strength.

If any rough metal exists on the outside and/or inside surfaces of root joint 60 it may be smoothed by a routing tool 62. Under most conditions, the routing or finishing is not required, but only fill welding passes will completely fill the welding groove 50.

Root portions 30 and 30' may be initially machined with slightly curved facing surfaces 36 and 36' or with a slight upward bevel at the bottom. Such a shape has been found to give a full weld pattern about the joint without inward expulsion of material which would be undesirable.

Figure 5:
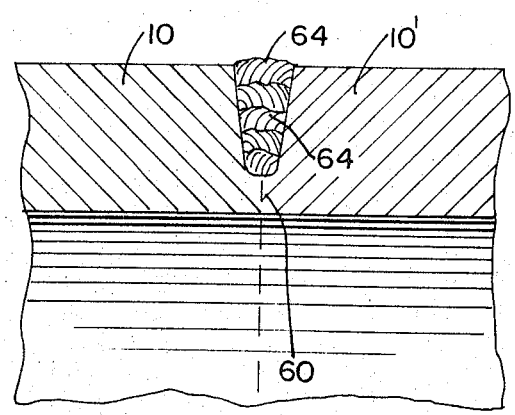

Once any undesirable burrs have been removed from the joint 60, the welding groove 50 is filled by applying successive layers of weld metal as shown in FIG. 5. Each layer of weld metal 64 may be placed by the use of a conventional fusion welding tool using a known process such as metal with inert gas (M.I.G.) welding.

This can be accomplished by automatic machines so that the filling process can be carried out at one station while the machining, upsetting and routing processes are carried out at another station. Filling to complete the joint could also be performed by any other suitable conventional means.

Although induction heating has been found to be most effective for the purposes of this invention, other means of heating the pipe ends, such as using suitable coils of resistance wire wrapped around the adjacent pipe ends, or using a suitable array of blow pipes using acetylene or any of the other well known heating gasses as a fuel, may be used. Likewise, the clamping and force means used to exert the axial and radial forces on the walls of each section of pipe may be positioned against the outside surfaces of the pipe. However, it is preferred to position such clamping and force means adjacent the interior surfaces of each pipe.

While the root portions or lands have been described above as having generally parallel upper and lower surfaces, it is recognized that these root portions may be of any desired configuration which will provide a full weld area with no appreciable inward or outward expulsion of material during upset. For example, dovetailed or tapered land configurations may be found suitable for particular welding projects.

While the invention has been described in relation to a preferred method of practicing it, it will be apparent to those skilled in the art that this method and its steps are capable of wide variation without departing from the principles and spirit of the invention.

I claim:

1. A method for securely and fluid tightly joining a pair of generally tubular members in end-to-end relationship, characterized by the steps of:
    forming an axially extending root portion on an end of each tubular member having a lesser radial dimension than the radial thickness of the wall of each tubular member, to provide a peripheral welding groove when said members are brought into abutting co-axial relationship;
    co-axially aligning said tubular members so that the ends of each of said tubular members having said axially extending root portions formed thereon are disposed in closely spaced relationship opposite and facing one another;
    heating said closely spaced ends of said tubular members having said axially extending root portions to a sufficiently high temperature such that said root portions may be welded together;
    forcing said tubular members axially toward one another to bring said axially extending root portions into intimate, abutting relationship with sufficient force to upset said root portions and weld these root portions together to form a solid and perfectly sealed root joint which joins said tubular members together; and,
    applying weld metal in said welding groove formed by said root joint and said facing ends of said tubular members sufficient to fill said groove and completely form and seal the joint between said tubular members.

2. The method set forth in claim 1 including the step of smoothing at least the outer radial surface of said root joint which forms the bottom of said welding groove prior to applying said weld metal to fill said groove to remove metal burrs and thereby enhance the weld bond.

3. The method set forth in claim 1 including purging the interior and exterior of said tubular members about the ends of said members having said root portions with an inert gas while heating said ends to prevent oxidation during welding thereby to assist in preventing oxidation during welding thereby to assist in preventing microcracking and improve the appearance of the joint formed.

4. The method set forth in claim 1 wherein heating is accomplished by means of induction coils placed adjacent the joint area formed by the spaced ends of said tubular members having said axially extending root portions.

5. The method set forth in claim 1 wherein clamping means exert a radial force on the wall of each member equal to approximately 1½ times the axial force exerted on each of said members in forcing them together to upset said axially extending root portions.

6. The method set forth in claim 5 wherein both said radial force and said axial upset force are applied to each of said tubular members by clamping means positioned relative to each of said members to frictionally engage the wall thereof.

7. The method set forth in claim 1 wherein said axially extending root portions are formed by machining the ends of said tubular members which are to be joined.

8. The method set forth in claim 7 wherein the ends of the walls of said tubular members are machined to form a radially thin root portion which projects axially from the end of the wall of each tubular member to form a land having generally parallel top and bottom surfaces and an outer face shaped to assure a full weld pattern without inward expulsion of material during upset.

9. The method set forth in claim 1 wherein said axially extending root portion is formed adjacent the inside surface of the wall of each of said tubular members.

10. A method for securely and fluid tightly joining two generally tubular members in end-to-end relationship, characterized by the steps of:
    machining the ends of each of said tubular members to form a radially thin, axially extending root portion on the end of each of said members, said root portions providing a peripheral welding groove when said tubular members are brought together in abutting relationship;
    co-axially aligning said tubular members so that the ends of each tubular member having axially extending root portions formed thereon are disposed in closely spaced relationship opposite and facing one another;
    heating said closely spaced ends of said tubular members having said axially extending root portions to a sufficiently high temperature such that said axially extending root portions may be welded together;
    purging the space about the ends of said tubular members having said root portions with an inert gas while heating said ends, to prevent oxidation during welding thereby assisting in preventing microcracking;
    forcing said tubular members axially toward one another to bring said axially extending root portions into intimate, abutting relationship with sufficient force to upset said axially extending root portions and thereby weld these root portions together to form a solid and perfectly sealed root joint which joins the tubular members together; and, applying sufficient layers of weld metal in said welding groove formed by said root joint and the opposite ends of said tubular members over said root joint to fill said welding groove and thereby completely form the joint which seals said tubular members together.

11. The method set forth in claim 10 wherein heating is accomplished by means of induction coils placed adjacent the joint area formed by the spaced ends of said tubular members having said axially extending root portions.

12. The method set forth in claim 10 wherein clamping means exert a radial force on the wall of each member equal to apporximately 1½ times the axial force exerted on each of said members in forcing them together to upset said axially extending root portions.

13. The method set forth in claim 10 wherein the ends of the walls of said tubular members are machined to form a radially thin root portion which projects from the end of the wall of each tubular member adjacent the interior surface of the wall of said tubular member to form a land having generally parallel top and bottom surfaces and an outer face shaped to assure a full weld pattern without inward expulsion of material during upset.

* * * * *